June 2, 1964 C. R. LIPUMA ETAL 3,135,700
METHOD AND APPARATUS FOR CATALYST REGENERATION
Filed Dec. 1, 1959 3 Sheets-Sheet 1

Fig. I

Charles R. Lipuma
Felix J. Ponzek    Inventors

By George J Silhavy

Patent Attorney

Charles R. Lipuma
Felix J. Ponzek    Inventors

By George J Silbey

Patent Attorney

Charles R. Lipuma
Felix J. Ponzek  Inventors

By *George J Silvay*

Patent Attorney

United States Patent Office 3,135,700
Patented June 2, 1964

3,135,700
METHOD AND APPARATUS FOR CATALYST REGENERATION
Charles R. Lipuma, Morris Plains, and Felix J. Ponzek, Hanover, N.J., assignors to Esso Research and Engineering Company, a corporation of Delaware
Filed Dec. 1, 1959, Ser. No. 856,394
13 Claims. (Cl. 252—417)

This invention relates to fluid catalytic cracking and more particularly relates to improvements in contacting between finely divided catalyst solids and gaseous materials. More particularly the invention relates to improving contacting in catalyst regeneration vessels where the catalyst particles and regenerating gas are introduced as separate streams into the regenerator.

In the fluid catalytic cracking process there are units in which an oxygen-containing gas, such as air, and spent catalyst are mixed and the resulting suspension of solid catalyst particles in oxygen-containing gas, such as air, is passed through a distribution grid in the bottom of the regeneration vessel to provide a dense fluidized bed or mixture of catalyst above the distribution grid. In the newer fluid catalytic cracking units, the catalyst particles are introduced into the regenerator above the horizontal distribution grid and the air is separately introduced below the grid to fluidize the catalyst particles during renegeration. The present invention is concerned with the regenerators just described in use in the newer fluid catalytic cracking units.

With these newer units there has not generally been as good regeneration as with some of the older units in which catalyst and air as a mixture are passed through the distribution grid. It has been found that a certain pressure drop through the grid is necessary to prevent downflow of catalyst through the holes in the grid and recirculation of the catalyst particles up through the grid. It has been further found that the regeneration of the newer units such as shown in U.S. Patent No. 2,589,124, granted to Packie March 11, 1952, is not as efficient as the regeneration in the older type units where catalyst and air pass as a mixture through the distribution grid.

It has been discovered that an air-catalyst mixture passing through a distribution grid requires only one-half the pressure drop across the grid to maintain the same fluidized bed (weight) of catalyst as when using air alone through the grid with the catalyst being introduced into the regenerator above the grid.

More specifically the present invention discloses that improved regeneration of the catalyst may be obtained in the type of regenerator shown in the Packie patent by continuously diverting some of the catalyst being introduced into the regenerator or continuously recycling some of the catalyst from the bed into the space below the grid so that the density of the catalyst-air mixture passing through said grid is between about 0.20 and 0.35 pound per actual cubic foot at the temperature and pressure below the grid in the regenerator.

With the present invention the catalyst will be more efficiently regenerated and as a result the regenerated catalyst will be more active and this credit can be applied to increased conversion of about 3 to 5% or an increased oil feed rate of 4 to 8%.

Figure 1:
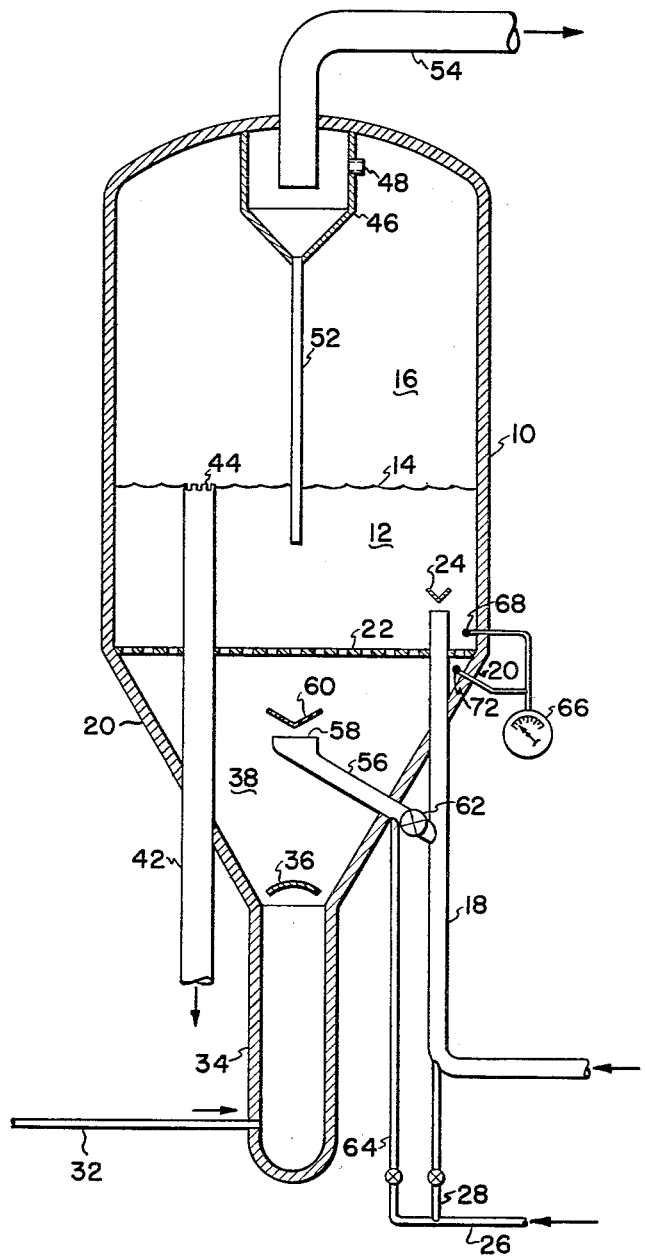
FIG. 1 represents an elevational view partly in section of one form of the invention.

Referring now to FIG. 1 of the drawings, the reference character 10 designates a vertically arranged cylindrical vessel which in the present invention is a regeneration vessel adapted to contain a dense fluidized bed of catalyst 12 having a level indicated at 14. Above the level 14 is a dilute phase 16 which is a dispersion of catalyst particles in regeneration gas passing upwardly through the regeneration vessel 10.

The catalyst is any conventional cracking catalyst such as silica alumina, silica magnesia, silica alumina magnesia, silica zirconia, activated bentonitic clays, etc. The particle size of the catalyst is preferably between about 0 and 100 microns with most of the catalyst being of a size between about 20 and 80 microns. The superficial velocity of the air passing upwardly through the fluidized bed 12 is between about 0.5 and 5 feet per second and under these conditions the catalyst is fluidized and forms a dense turbulent mixture of air and catalyst particles having a density between about 10 and 35 lbs. per cubic foot. The coke or carbonaceous material on the catalyst is burned and the temperature during regeneration in regeneration vessel 10 is between about 1000° F. and 1200° F.

The reactor is not shown in the drawings but is incorporated by reference to the Packie Patent 2,589,124 and the conditions during cracking include a temperature between about 850° and 1100° F. and a pressure between atmospheric and 50 p.s.i.g. and a superficial velocity of the gas and vapor passing up through the reactor of between about .5 and 5 feet per second.

The pressure during regeneration may be between about atmospheric and 50 lbs. p.s.i.g. During the cracking operation carbonaceous material or coke is deposited on the catalyst particles and it is necessary to regenerate the catalyst to remove the carbonaceous deposit. In the present operations of units of this type the regeneration is not as efficient as could be desired as in most cases the regenerated catalyst contains between about .5 and .7 weight percent of coke. According to the present invention the regeneration is improved to reduce the coke on the catalyst to between about 0.05 and 0.40 wt. percent carbon or coke on the catalyst. The oil feed to the reactor may be gas, oil, naphtha, topped crude, etc.

The spent catalyst or catalyst to be regenerated comes from the reactor and is passed through riser 18 which is shown as a vertical line extending upwardly through the conical bottom 20 of the vessel 10 at one side thereof and through the grid 22 which is a perforated distribution grid arranged horizontally in the bottom of the regeneration vessel 10. The regenerator may have a diameter between about 10 and 50 feet and a straight side height upwardly from the grid 22 of between about 20 and 50 feet. The transfer line 18 extends between about 2 feet to 10 feet above the horizontal grid 22 and has a diameter between about 1.5 and 4 feet. Arranged above the open end of the transfer line 18 is an inverted conical deflector diagrammatically shown at 24 to deflect the stream of catalyst and air being discharged from the top of the vertical transfer line 18. Instead of a conical deflector, a flat plate deflector may be used.

Regenerating gas such as air is introduced through line 26 and then passed through valved line 28 for introduction into the lower portion of the transfer line 18. This portion of the air is only used to control the rate of flow of catalyst through the line 18 and to control the rate of addition of the catalyst to the regenerator 10.

The major portion of the regeneration gas is introduced through line 32 into the bottom portion 34 of regeneration vessel 10 which in the unit forms an auxiliary burner which is used only during startup but may be used in cases where insufficient heat is supplied on regeneration of the catalyst. Above the top of the depending vessel or chamber 34 is a hollow hemispherical refractory hood 36 with its convex surface upwardly to direct or deflect the gas as an annular stream into the space 38 below the horizontal grid 22. The pressure drop across the grid 22 is sufficient to prevent catalyst dropping down through the grid holes or refluxing through the grid holes and is usually between about 0.5 and 3.0 pounds per square inch.

Overflow well or vertical line 42 is shown as extending into the regenerator and arranged at the opposite side of regenerator 10 but may be arranged such that the minimum distance from the riser 18 is ½ of the vessel diameter. Overflow well 42 is provided for withdrawing regenerated catalyst from the regeneration vessel 10. The top of the withdrawal line 42 is provided with notches or cutaway portions 44. The upper end of the withdrawal well or line 42 determines the level of catalyst in the regenerator 10. The overflow line 42 may have a diameter between about 3 and 7 feet and the area of the notches 44 may be between 20% and 75% of the area of the inlet to the overflow well 42. The overflow line 42 extends between about 15 and 30 feet above grid 22. The catalyst is withdrawn and passed through the line 42 as a dense fluidized mixture and is recycled to the reactor where it is used for cracking an additional amount of hydrocarbon oil feed to produce motor fuel such as gasoline and gaseous hydrocarbons.

The regeneration gases passing upwardly from the dense fluidized bed 12 pass through a solids separating means such as cyclone separator 46 arranged inside and at the top of regeneration vessel 10. The separator 46 has an inlet 48 and dipleg 52 for returning separated solids from the gases leaving the regeneration vessel 10. Preferably the dipleg 52 extends beneath the level 14 of the dense fluidized bed in the regenerator. The hot regeneration gases are taken overhead through line 54 leading from the cyclone separator 46 and these hot regeneration gases may be passed through a waste heat boiler or other heat recovery means.

As pointed out above in the conventional units of this type the regeneration could be improved to increase the removal of coke or carbonaceous material from the catalyst particles. According to the present invention as shown in the modification in FIG. 1 a portion of the spent catalyst passing upwardly through riser or transfer line 18 is diverted through branch or bypass line 56 which extends upwardly at an angle from the line 18 through the conical bottom 20 of the vessel 10 and into the space 38 below the grid 22. The branch line has a diameter between about 3 and 12 inches. The outlet 58 of branch line 56 is preferably horizontally arranged and above the outlet 58 there is provided an inverted conical deflector or other deflector 60 for distributing the catalyst beneath the distribution grid 22. The branch line 56 is provided with valve 62 which is used only as a positive shutoff valve.

For controlling the amount of catalyst withdrawn from vertical line 18 and passed through bypass line 56, a portion of the regenerating gas or air is diverted from line 26 through valved line 64 for introduction into the lower portion of the branch line 56. With the valve 62 open, the amount of spent catalyst diverted from the main stream passing from transfer line 18 into the bypass line 56 is controlled by the amount of gas passing through line 64 and introduced into the bypass line 56. The amount of catalyst introduced into the space 38 below the grid from line 56 is controlled to give a density of the catalyst-air suspension in space 38 of between about 0.2 and 0.35 lb. per actual cubic foot at the conditions of temperature and pressure prevailing in space 38. Some burning of the coke on the catalyst takes place in riser 18 and branch line 56 and the rest of the burning or regeneration takes place in fluidized bed 12 in the regenerator 10.

With the density in line 18 being between about 15 and 30 lbs. per cubic foot, the amount of air introduced through line 64 into branch line 56 is between about 200 and 600 actual cubic feet per minute.

In a specific case with the density of the mixture flowing up through line 18 being about 20 lbs./cu. ft., about 320 actual cubic feet of air will be diverted through line 56 at a temperature of about 300° F. to aerate the hot catalyst particles in line 56 and cause them to flow out into region 38 below the grid 22 to give a density of about 0.25 lb. per cubic foot of the catalyst mixture to be passed through grid 22. In actual operation the pressure drop across the grid will be used to determine and control the density of the catalyst air mixture in space 38 between the limits just given.

The pressure drop across the distribution grid 22 is measured by pressure indicator 66 which indicates the difference in pressure between the pressure indicated by a pressure responsive means at 68 above the distribution grid 22 inside the regenerator 10 and submerged in the dense fluidized bed 12 and a second pressure responsive means 72 arranged in the space 38 of the conical portion 20 of the vessel 10 below the distribution grid 22. The pressure indicator 66 is any conventional type of pressure measuring device suitable for the pressure range involved.

Figure 2:
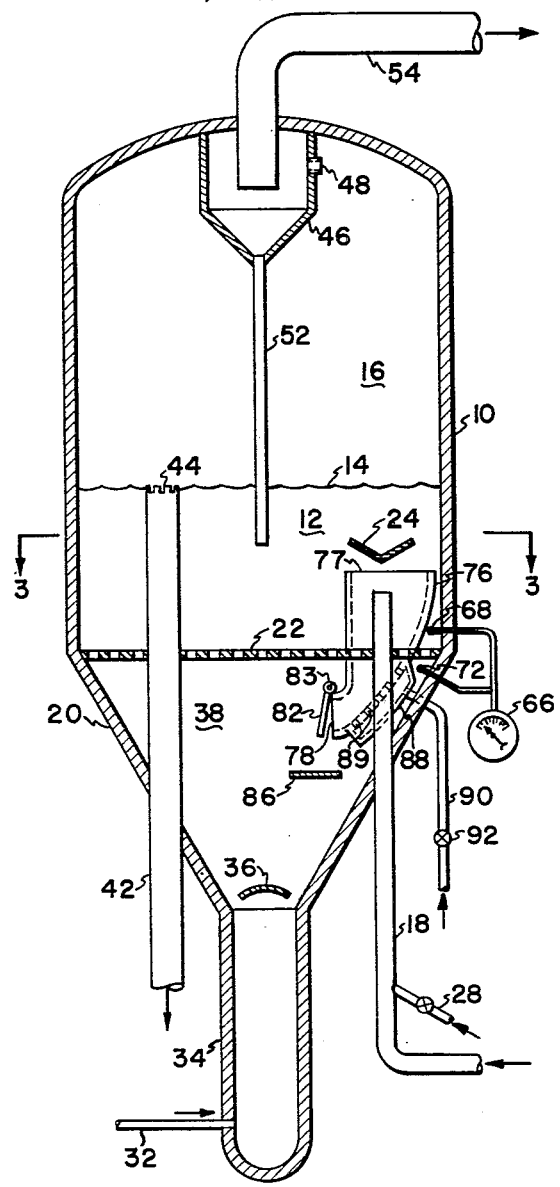
FIG. 2 represents a front elevation with parts in section of another modification.
Figure 3:
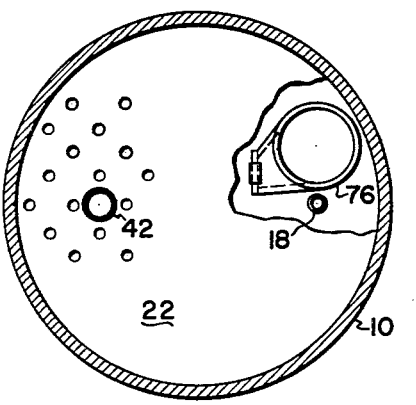
FIG. 3 represents a horizontal cross section taken substantially on line 3—3 of FIG. 2.

Referring now to FIGS. 2 and 3, the elements which are the same as in FIG. 1 are designated by the same reference characters. In this form of the invention a separate vertically arranged funnel or conical collector 76 is provided which extends a short distance above the grid 22 to receive and collect catalyst from the dense fluidized bed 12 where the carbon is essentially unburned. Some burning of the coke on the catalyst takes place in riser 18. The conical collector 76 is arranged near the outlet of riser 18 so that the catalyst passing to the collector 76 is only partially regenerated or the carbon or coke essentially unburned.

The upper end of the collector 76 extends about 1 to 6 feet above the grid 22. The upper end 77 of collector 76 is below the level 14 of the fluidized bed and below the top of overflow well 42 and is open and horizontally arranged and as shown in FIG. 2 extends to a higher level than the top of inlet line 18. The collector or funnel 76 extends through the grid member 22 and below between about 3 and 5 feet and has an opening at its lower end arranged vertically and below the distribution grid 22. The upper open end 77 of the conical collector 76 is of a larger diameter than the bottom outlet or opening 78.

The degree of opening of outlet 78 is controlled by flapper valve 82 loosely hinged at its upper end to the collector 76 at 83. The amount of catalyst passing through opening 78 is controlled by the amount of aeration gas introduced into collector 76 to fluidize the catalyst particles in the collector as will presently be described in greater detail. The upper end 77 of the collector or funnel 76 is open so that it receives catalyst particles directly from the dense fluidized bed 12. Arranged below the opening 78 of the collector 76 and above hood 36 is a splash plate 86 for receiving catalyst discharged from the opening 78 of the collector 76 into space 38 below grid 22.

For controlling the fluidity or density of the fluidized solids in the conical collector 76 and the amount of catalyst particles discharged through opening 78, an aeration manifold 88 is provided for introducing gas such as air or steam into the lower curved portion of the collector 76 at one or more points 89. The gas is introduced into manifold 88 through main line 90 provided with a valve 92. Increasing the amount of fluidizing gas introduced through lines 89 decreases the density of the catalyst mixture in collector 76 and decreases the rate of discharge of catalyst particles from collector 76 into space 38. Decreasing the amount of fluidizing or aerating gas introduced through lines 89 will have the opposite effect and will increase the rate of discharge of catalyst particles from collector 76 into space 38. This method of control is based on changing the catalyst bulk density which changes the amount of force exerted on the valve 82. Decreasing the density decreases the force, reducing the amount the valve 82 will open.

The pressure drop indicator 66 is utilized to determine the pressure drop across the grid 22 and this in turn is used to determine the amount of catalyst which is discharged from the collector 76 into the space 38 below the grid 22 as will be hereinafter described in greater detail in connection with FIG. 1. From FIG. 3 it will be seen that the collector 76 is arranged behind the main transfer line 18.

Figure 4:
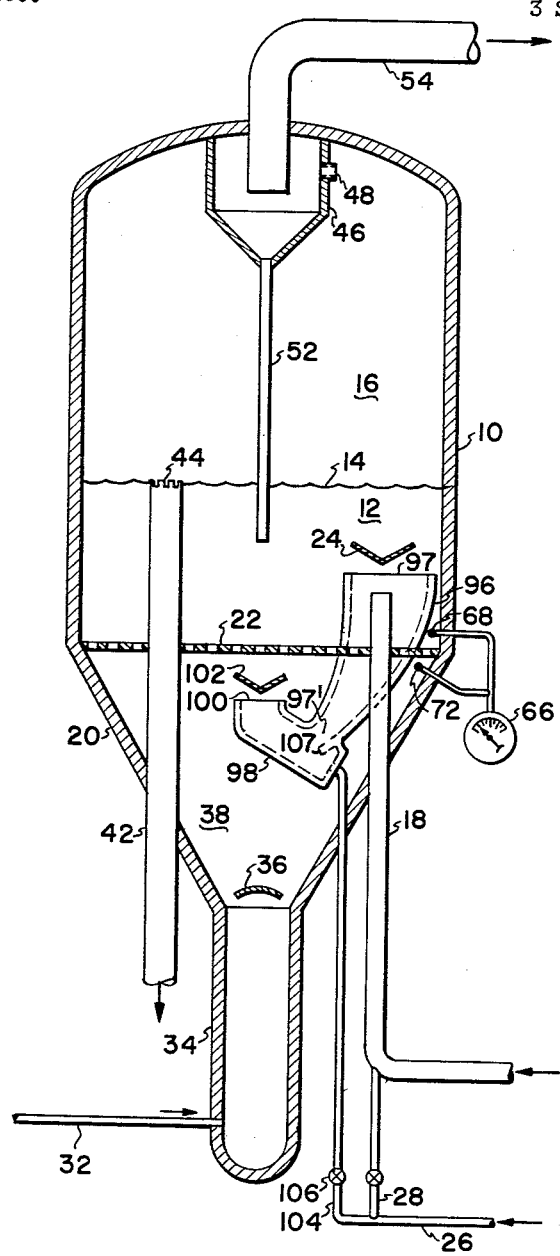
FIG. 4 represents a front elevation of another form of the invention with parts in section.

Referring now to FIG. 4, this form of the invention is a variant and combination of the other two forms and includes the riser or main vertically arranged transfer line 18 and a conical collector or funnel 96 which has its open upper end 97 horizontally arranged and extending above the grid 22 and opening into the dense fluidized bed 12 in the regenerator 10. The upper end 97 is below the top of overflow well 42. The collector 96 extends down through the distribution grid 22 into the space 38 in the bottom conical portion 20 of the regeneration 10 below grid 22. In this form of the invention the bottom narrow open end 97' of the conical collector 96 discharges into a bypass line 98 which is upwardly directed to the left in FIG. 4 and which has a horizontally arranged outlet 100 beneath the horizontal grid 22. Fluidized catalyst flows from the fluidized bed 12 into the collector 96. Preferably no fluidizing gas is introduced into collector 96. Deflector 102 is provided above the outlet 100 to distribute the catalyst being introduced below the grid 22.

A portion of the control air passing through line 26 is bypassed through line 104 having a valve 106 for controlling the rate of flow of fluidizing regenerating gas or air introduced into the lower end portion of the bypass line 98 arranged near the bottom of collector 96. By varying the amount of fluidizing gas introduced into the lower end of the bypass line 98, the amount of catalyst being introduced into the space 38 through bypass line 98 below the grid 32 is controlled in the same way as pointed out above in connection with the operation of the other modifications of the invention. The line 104 introduces air into the lower right hand end of bypass line as shown in FIG. 4 and the lower wall member of collector 96 has an extension or lip 107 which extends above the outlet end of aeration line 104 to prevent gas introduced through line 104 from entering and flowing up through collector 96. The lip 107 with the upper wall of collector 96 form the restricted discharge opening 97' on the collector 96.

Referring now to FIG. 1 which is the preferred form of the invention and with the unit in operation and with catalyst to be regenerated being introduced only above the grid 22 through line 18, there will be a certain pressure drop measured on the indicator 66. In normal operation for a unit such as set forth in column B in Table 1 hereinafter, this pressure drop will be about 1.2 p.s.i. and under these conditions the regenerated catalyst has about 0.55 wt. percent carbon or coke on it.

According to the present invention in FIG. 1 the valve in the auxiliary gas line 64 is opened and with the valve 62 open, a portion of the spent catalyst is bypassed from line 18 into the space 38 below the grid 22 and when this happens the pressure drop measured on the indicator 66 is increased to 1.5 p.s.i. and this is an indication that the density of the catalyst gas mixture passing upwardly through the grid 22 is about 0.25 lb. per cubic foot under actual conditions. According to the present invention the density of the catalyst-gas mixture in space 38 beneath the distribution grid 22 should be between about 0.20 and 0.35 lb. per cubic foot. With this introduction of a small amount of catalyst below the grid 22 there will be a reduction of about 60% of the carbon on the catalyst so that the regenerated catalyst will contain about 0.29 wt. percent carbon. Going above 0.35 lb. per cubic foot or below 0.20 lb. per cubic foot will not give the improvement in regeneration above noted. Preferably the low limit of 0.20 lb. per cubic foot is used as then less catalyst need bypassed from riser 18 or passed through conical member in FIGS. 2 and 4 to the space 38 below grid 22 in the regenerator 10.

In FIG. 2 the amount of catalyst being passed from the dense fluidized bed 12 through the conical collector 76 into the space 38 below the grid 22 is controlled by controlling the aeration gas introduced through line 90 and aeration lines 89. Here again the pressure drop is measured by the indicator 66 and the amount of gas introduced through line 90 is controlled to obtain the desired change in pressure drop across the grid 22.

In FIG. 4 the amount of catalyst introduced below the grid 22 is controlled by controlling the amount of gas passing through line 104 into the bottom portion of branch line 98 arranged at the bottom of the conical collector 96. The amount of gas introduced into the bypass line 98 is controlled in response to the reading on the pressure drop indicator 66 as was done in the description of the other two forms of the invention. As an added improvement (not shown), the pressure drop across the grid 22 may be used to automatically control the amount of gas passing into the branch line 98 from the collector 96 in FIG. 4, the branch line 56 in FIG. 1 and into lines 89 in FIG. 2.

Referring again to FIG. 1 with a definite known holdup of cracking catalyst in the dense fluidized bed 12 and a selected superficial velocity of air passing up through the dense fluidized bed 12 there will be a certain pressure drop across distribution grid 22. According to the present invention it is desired to increase the pressure drop across the grid 22 by introducing some catalyst below the grid 22. To do this, with valve 62 open, the valve in line 64 is manipulated to pass a certain amount of air through line 64 into the bottom portion of branch line 56 to introduce a small portion of solid catalyst particles from the riser or transfer line 18 into the space 38 below the grid 22. The amount of catalyst bypassed into the bottom space 38 is between about .2 and .35 lb. per actual cubic foot of air in space 38 and this increases the pressure drop across the grid 22.

It can be determined that for a given unit a certain amount of catalyst added to the space 38 beneath the grid will give a certain increase in pressure drop across the grid and this increase in pressure drop is calibrated to determine the density of the gas and solids mixture to be passed up through the grid 22. According to the present invention enough catalyst particles are added to the air stream below the grid to produce a catalyst-air mixture having a density between about 0.2 and 0.35 lb. per actual cubic foot at the conditions of operation. This increase in pressure drop will be between about 10 to 35%.

The pressure drop through the distribution grid 22 for any unit will vary with changes in the volume of gas and the open area of the distributor. With different units the pressure drop will be different, but when the pressure drop is taken across the grid 22 in a given unit with only air passing through the grid, the pressure drop will be one figure and when catalyst particles are added to the stream of air passing up through the grid the pressure drop will change and will be easily determined by the pressure drop indicator on the unit and from this it will be easily determined how much catalyst to continuously recycle to or introduce into the space below the grid 22 to produce a mixture of catalyst and air having a density between about 0.20 and 0.35 lb. per cubic foot.

Or, knowing the air rate in standard cubic feet per minute introduced below the grid 22 and knowing the temperature in the space 38 below the 22, the line 64 in FIG. 1 can be calibrated to introduce a certain number of cubic feet of gas per minute to bypass a known amount of catalyst particles from line 18 into the space 38 to obtain a catalyst-gas mixture having a density between about 0.20 and 0.35 lb. per cubic foot in the space 38.

As specific examples showing the improvement to be obtained by the present invention data comparing two units are provided in the following Table 1.

Table 1

|  | A | | B | |
|---|---|---|---|---|
| Mechanical Data: | | | | |
| Pipe 42—Height above grid 22, Ft | 10.33 | | 12.0 | |
| Pipe 42—Diameter, Ft | 7.5 | | 2.5 | |
| Regenerator—Inside Diameter, Ft | 31.0 | | 15.5 | |
| Open Area of Grid, Ft.² | 2.05 | | 0.69 | |
| Pipe 18—Height above grid 22, Ft | 2.00 | | 2.00 | |
| Pipe 18—Diameter, Ft | 3.75 | | 1.67 | |
| Regenerator Height—Straight Side, Ft | 30.33 | | 27.0 | |
| Height of notches 44, inches | 12 | | 12 | |
| Process Data: | | | | |
| Catalyst Circulation Rate, Tons per min | 25.0 | | 7.6 | |
| Grid Holdup, Tons | 79.3 | | 25.9 | |
| Regenerator Bed Temp., °F | 1,103 | | 1,099 | |
| Top Press., p.s.i.g | 11.5 | | 11.4 | |
| Total Dry Air Rate, s.c.f.m | 33,790 | | 12,700 | |
| Control Air Rate, s.c.f.m | 4,750 | | 1,100 | |
| O₂ in Flue Gas, Mol percent | 0.6 | | 0.8 | |
| Percent 0-40 Micron Fines | 10.0 | | 3.0 | |
| Grid Temp., °F | 265 | | 328 | |
| Pressure on Grid, p.s.i.g | 14.7 | | 13.0 | |
| Pressure Drop Across Grid (no catalyst below grid), p.s.i | 0.61 | | 0.82 | |
| Superficial Velocity, Ft./Sec | 1.25 | | 1.8 | |
| Actual Carbon on Catalyst, Wt. percent | 0.43 | | 0.65 | |
| Operation according to present invention by adding catalyst below grid: | | | | |
| Catalyst loading below and through grid, lb./c.f. | 0.20 | 0.35 | 0.20 | 0.35 |
| Percent of Circulating Catalyst | 7.2 | 16.9 | 6.6 | 16.5 |
| Carbon on regenerated catalyst, Wt. percent | 0.33 | 0.33 | 0.29 | 0.29 |
| Percent Reduction of Carbon on Catalyst | 30.0 | 30.0 | 59.7 | 59.7 |
| Pressure drop across grid, p.s.i | 1.10 | 1.30 | 1.00 | 1.10 |

In column B of Table 1 under process data it is shown how one unit operates on the regenerator side and catalyst is regenerated to .65 weight percent carbon or coke remaining on the catalyst. The lower portion of Table 1 shows that by adding catalyst to the air below the grid improved regeneration is obtained and the weight percent carbon or coke on the regenerated catalyst is reduced to 0.29. For the specific operation given in column B of Table 1 it is noted that the pressure drop across the grid 22 when operating the unit in its usual manner was 0.82 p.s.i., whereas when catalyst was added to the air in region 38 below the grid 22 for passage up through the grid, the pressure drop across the grid increased as shown in the table when adding catalyst to provide a density of the mixture below the grid 22 of between about 0.20 and 0.35 lb. per cubic foot. Hence in operating the unit as shown in column B under the conditions shown by increasing the pressure drop from 0.82 to between about 1.0 and 1.1 the process is modified to operate according to the present invention and improved regeneration is obtained.

The same is true of the unit operation shown in column A where the pressure drop through the grid is increased when using the present invention over that when carrying out the operation of the unit in the usual way. In this operation under column A, there is a reduction in carbon on the catalyst of about 30% whereas in the operation of the unit under column B there is a reduction of about 60%. By reducing the amount of carbon or coke on the regenerated catalyst there is improved activity of the catalyst and, when the catalyst is recycled to the reactor, advantage can be taken of this improved activity by either increasing the conversion from 3 to 5% at the same oil feed rate or increasing the oil feed rate by about 4 to 8% by weight at the same conversion.

What is claimed is:

1. In a process wherein catalyst particles are circulated between a reaction zone and a regeneration zone and wherein all the spent catalyst particles to be regenerated are continuously introduced directly into the dense fluidized bed of catalyst solids undergoing regeneration above a gas distributing zone and the regenerating gas is separately introduced into the lower portion of said bed of solids through said distributing zone as a plurality of gaseous streams, and the pressure drop across said distributing zone is maintained sufficiently high to prevent downflow of catalyst particles through said distributing zone, the improvement which comprises continuously introducing a small amount of catalyst particles into the region below said gas distributing zone and into the regenerating gas below said gas distributing zone before passage into said regeneration zone so that the suspension of catalyst in the regenerating gas introduced below said gas distributing zone for passage into said dense bed of catalyst particles has a density between about 0.20 and 0.35 pound per actual cubic foot.

2. In a process wherein catalyst particles are circulated between a reaction zone and a regeneration zone and wherein all the spent catalyst particles to be regenerated are introduced directly into the dense fluidized bed of catalyst solids undergoing regeneration and not below a gas distribution grid zone and the regenerating gas is separately introduced below said gas distribution grid zone and into the lower portion of said bed of solids through said distributing grid zone as a plurality of gaseous streams and catalyst particles do not flow down through openings in said distribution zone, the improvement which comprises introducing a small amount of catalyst particles into the regenerating gas below said distribution grid zone to produce a catalyst-gas mixture having a density of between about 0.20 and 0.35 pound per actual cubic foot and to increase the pressure drop through said distribution grid zone over that obtained when passing only regenerating gas through said distribution grid zone.

3. A process according to claim 2 wherein the catalyst particles are withdrawn from said dense fluidized bed and recycled to the region below said distributing zone.

4. A process according to claim 2 wherein the catalyst particles introduced below said distribution zone are spent catalyst particles to be regenerated and are a portion withdrawn from the stream of spent catalyst particles passing to said regeneration zone.

5. A process according to claim 3 wherein fluidizing gas is mixed with said catalyst particles to be recycled to control the rate of recycling of catalyst to the region below said distributing zone.

6. A process according to claim 1 wherein a portion only of the spent catalyst particles passing to said regeneration zone by direct addition to the fluidized bed is sent through a by-pass line before reaching said fluidized bed for passage to the region below said distributing zone.

7. A process according to claim 1 wherein a portion only of the spent catalyst particles passing to said regeneration zone by direct addition to the fluidized bed is sent through a by-pass line before reaching said fluidized bed for passage to the region below said distribution zone and the amount of spent catalyst passing through said bypass line is controlled by controlling the amount of fluidized gas introduced thereinto.

8. A process according to claim 1 wherein the suspension of catalyst in regenerating gas introduced below said gas distributing zone has a density of about 0.20 lb. per cubic foot.

9. An apparatus comprising a vertically arranged vessel having a top gas outlet, a sole distribution grid horizontally arranged in the lower portion of said vessel, a vertically arranged transfer line extending into said vessel and through said distribution grid a short distance above said distribution grid for introducing substantially all of the solids into said vessel above said distribution grid, a sole pipe for withdrawing solids from said vessel, means for introducing fluidizing gas as a separate stream below said distribution grid for fluidizing solids above said distribution grid, tubular means leading from said transfer line for introducing a small amount only of solids as a separate stream from said transfer line into said region below said distribution grid for increasing the pressure drop of the gas passing through said distribution grid to improve contacting between the solids above said distribution grid and the gas passing up through said vessel.

10. An apparatus according to claim 9 wherein said tubular means for introducing solids below said grid includes a branch line communicating with said vertical transfer line and having its outlet end arranged below said grid.

11. An apparatus according to claim 9 wherein said tubular means for introducing solids below said grid includes a branch line communicating with said vertical transfer line and having its outlet end arranged below said grid and means for introducing a controlled amount of fluidizing gas into the lower portion of said branch line to control the amount of solids being passed to the region below said distribution grid.

12. An apparatus including a vertically arranged vessel having a top gas outlet, a sole distribution grid horizontally arranged in the lower part of said vessel, a single vertically arranged transfer line extending into said vessel and through said distribution grid a short distance above said distribution grid for introducing substantially all of the solids into said vessel above said distribution grid, a sole pipe for withdrawing solids from above said distribution grid in said vessel, means for introducing fluidizing gas as a separate stream below said distribution grid for fluidizing solids above said distribution grid, additional means for introducing a small amount only of solids as a separate stream into said region below said distribution grid to increase the pressure drop of the gas passing through said distribution grid to improve contacting between the solids above said distribution grid and the gas passing upwardly through said vessel, said additional means including a conical collector extending from above said grid directly to the region below said grid for recycling solids from above said grid directly to the region below said grid.

13. An apparatus according to claim 12 including means whereby fluidizing gas is introduced into the lower portion of said collector for controlling the amount of solids leaving said collector.

References Cited in the file of this patent
UNITED STATES PATENTS

| | | |
|---|---|---|
| 2,472,537 | Kimball | June 7, 1949 |
| 2,492,948 | Berger | Jan. 3, 1950 |
| 2,857,240 | Quincy | Oct. 21, 1958 |
| 2,937,989 | Huntley et al. | May 24, 1960 |